US006018453A

United States Patent [19]

Daharsh et al.

[11] Patent Number: 6,018,453

[45] Date of Patent: Jan. 25, 2000

[54] SURGE ARRESTER PROTECTION SYSTEM AND METHOD

[75] Inventors: Ross Stuart Daharsh, S. Milwaukee; Gary Lee Goedde, Racine, both of Wis.

[73] Assignee: Cooper Industries, Inc., Houston, Tex.

[21] Appl. No.: 09/099,305

[22] Filed: Jun. 18, 1998

[51] Int. Cl.[7] ..... H02H 1/00

[52] U.S. Cl. ..... 361/117; 361/56; 361/111; 361/127

[58] Field of Search ..... 361/56, 91, 111, 361/115, 117, 127, 129

[56] References Cited

U.S. PATENT DOCUMENTS

| | | | |
|---|---|---|---|
| 4,191,908 | 3/1980 | Cunningham | 313/325 |
| 4,404,614 | 9/1983 | Koch et al. | 361/128 |
| 4,486,805 | 12/1984 | Cline | 361/133 |
| 4,729,053 | 3/1988 | Maier et al. | 361/118 |
| 4,736,272 | 4/1988 | Kato et al. | 361/138 |
| 4,743,997 | 5/1988 | Carpenter, Jr. | 361/118 |
| 4,803,588 | 2/1989 | Bzdak | 361/118 |
| 4,910,632 | 3/1990 | Shiga et al. | 361/127 |
| 4,930,039 | 5/1990 | Woodworth et al. | 361/127 |
| 4,980,789 | 12/1990 | Hopkinson et al. | 361/35 |
| 4,987,511 | 1/1991 | Hopkinson et al. | 361/35 |
| 5,004,877 | 4/1991 | Yin | 200/144 |
| 5,172,297 | 12/1992 | Imakoma et al. | 361/126 |
| 5,231,370 | 7/1993 | Arnold, Jr. et al. | 338/21 |
| 5,438,174 | 8/1995 | Slade | 218/118 |
| 5,446,242 | 8/1995 | Barrett | 174/140 R |
| 5,532,897 | 7/1996 | Carpenter, Jr. | 361/118 |
| 5,594,613 | 1/1997 | Woodworth et al. | 361/127 |

FOREIGN PATENT DOCUMENTS

| | | | |
|---|---|---|---|
| WO 95/03643 | 2/1995 | WIPO | H01T 1/04 |

OTHER PUBLICATIONS

Power Capacitors; Cooper Power Systems, Inc.; p. 1–6; Apr. 1991.

Polymer Surge Arrestors—An ABB Success Story; Electrical World; p. 24, 28, and 30; Jul. 1996.

*Primary Examiner*—Stephen W. Jackson
*Attorney, Agent, or Firm*—Fish & Richardson P.C.

[57] ABSTRACT

A surge arrester protection system includes a surge arrester, a first mechanism fixed on a first end of the surge arrester for directing arcs around the surge arrester and a second mechanism fixed on a second end of the surge arrester for directing arcs around the surge arrester. The first and second mechanisms each include a plurality of slots extending substantially radially therein. Additionally, a cap which covers a lower end of the arrester is used to catch material dripping from the surge arrester and a cap covering an upper end of the arrester is used to protect the arrester from animals and the elements.

29 Claims, 8 Drawing Sheets

SURGE ARRESTER PROTECTION SYSTEM AND METHOD

BACKGROUND

The present invention relates to the protection of a surge arrester. More particularly, the present invention relates to a surge arrester protection system and method which, among other things, reduces the production of molten metal and provides a trap to catch any molten metal that may be generated during the venting process.

A surge arrester, also called a lightning arrester, is commonly connected in parallel with a comparatively expensive piece of electrical equipment in order to shunt over voltage surges, such as those caused by lightning strikes, to ground, thereby protecting the equipment and circuit from damage or destruction. A modern surge arrester typically includes an elongated enclosure made of an electrically insulating material, a series of voltage dependent nonlinear resistive elements retained within the housing, and a pair of electrical terminals at opposite ends of the housing for connecting the arrester between line and ground.

The voltage dependent nonlinear resistive elements employed are typically metal oxide varistor elements formed into relatively short cylindrical disks which are stacked on top of each other within the enclosure. Other shapes and configurations are also used for the varistor elements. The varistor elements provide either a high or low impedance current path between the arrester terminals depending on the voltage appearing across the varistor elements themselves. More specifically, at the power system's steady state or normal operating voltage, the varistor elements have a relatively high impedance. As the applied voltage is increased, gradually or abruptly, their impedance progressively decreases until the voltage appearing across the varistors reaches the elements' breakdown voltage, at which point their impedance dramatically decreases and the varistor elements again become highly conductive.

Accordingly, if the arrester is subjected to an abnormally high transient over voltage, such as resulting from a lightning strike or power frequency over voltage, the varistor elements become highly conductive. In this highly conductive state, the varistor elements conduct the resulting transient current to ground. As the transient over voltage and resulting current dissipates, the varistor elements' impedance once again increases, restoring the arrester and electrical system to their normal, steady-state condition.

Occasionally, the transient condition may cause some degree of damage to one or more of the varistor elements. Damage of sufficient severity can result in arcing from one terminal to the other within the arrester enclosure, leading to extreme heat generation and gas evolution as the internal components in contact with the arc are vaporized. The gas evolution causes the pressure within the arrester to increase rapidly until it is relieved by either a pressure relief mechanism or by the rupture of the arrester enclosure. The failure mode of arresters under such conditions may include the expulsion of components or component fragments in all directions. Such failures pose potential risks to personnel and equipment in the vicinity. Equipment may be especially at risk when the arrester is housed within the equipment it is meant to protect, e.g., in the tank of a transformer.

Attempts have been made to design and construct arresters which will not catastrophically fail with the expulsion of components or component fragments. One such arrester is described in U.S. Pat. No. 4,404,614, the contents of which are incorporated herein by reference in its entirety. U.S. Pat. No. 4,404,614 discloses an arrester having a non-fragmenting liner and outer housing, and a pressure relief diaphragm located at its lower end.

Despite such attempts, the above-described arresters may still fail with expulsion of components or fragments of components. This may in part be due to the fact that when the internal components in these arresters fail, the resulting arc vaporizes the components and generates gas at a rate that cannot be vented quickly enough to prevent rupture of the arrester enclosure.

Solutions to the above-mentioned problem have been made which force the arc to form outside of the arrester. For example, FIG. 1A illustrates one possible solution to the above-mentioned problem as described in U.S. Pat. No. 4,930,039, the contents of which are incorporated here by reference in its entirety.

The arrester of FIG. 1A, includes a subassembly enclosure, one or more electrical components stacked in series within the enclosure, and outlets formed in the wall of the enclosure for transferring an internal arc outside a length of the enclosure and diverting the arc current around some, or all, of the internal components. The outlets allow the ionized gas which is formed during failure, to be vented through the wall of the enclosure thereby forming an alternate conducting path in parallel with the higher impedance path formed by the internal components.

Another approach used to keep the arc produced during the venting process outside a length of the arrester is that made by the use of a monolithic, active resistor core made of voltage-dependent resistance material based on zinc oxide. For example, FIG. 1B illustrates a surge arrester with a monolithic core based on zinc oxide as described in U.S. Pat. No. 4,729,053, the contents of which are incorporated herein by reference in its entirety. The resistor core is sealed in a insulator jacket which is made as a cast-around mass in epoxy resin, concrete polymer, silicone resin or as a sheathing in the form of a shrink-fit tube, a coating, a paint or a glazing.

The arcs produced upon the failure of arresters similar to the ones shown in FIG. 1A and FIG. 1B, typically produce an arc which spans the surge arrester from its two terminals and across the body of the surge arrester. During venting, due to the extreme temperature and current of the arc, components of the surge arrester and its terminals tend to melt, which in turn produces molten metal which can fall to the ground and start a fire and/or harm people or objects nearby.

Therefore, there is a need for a surge arrester which will upon venting produce less molten material, as well as prevent any molten material formed from falling to the ground or escaping the vicinity of the surge arrester.

SUMMARY

A surge arrester protection system includes a surge arrester, a first mechanism fixed on a first end of the surge arrester for directing arcs around the surge arrester and a second mechanism fixed on a second end of the surge arrester for directing arcs around the surge arrester. The first and second mechanisms each include a plurality of slots extending substantially radially therein. Additionally, a cap which covers a lower end of the arrester is used to catch material dripping from the surge arrester and a cap covering an upper end of the arrester is used to protect the arrester from animals and the elements.

BRIEF DESCRIPTION OF THE DRAWINGS

The objects and advantages of the invention will be understood by reading the following detailed description in conjunction with the drawings in which.

DETAILED DESCRIPTION OF THE PREFERRED EMBODIMENTS

Figure 1A:
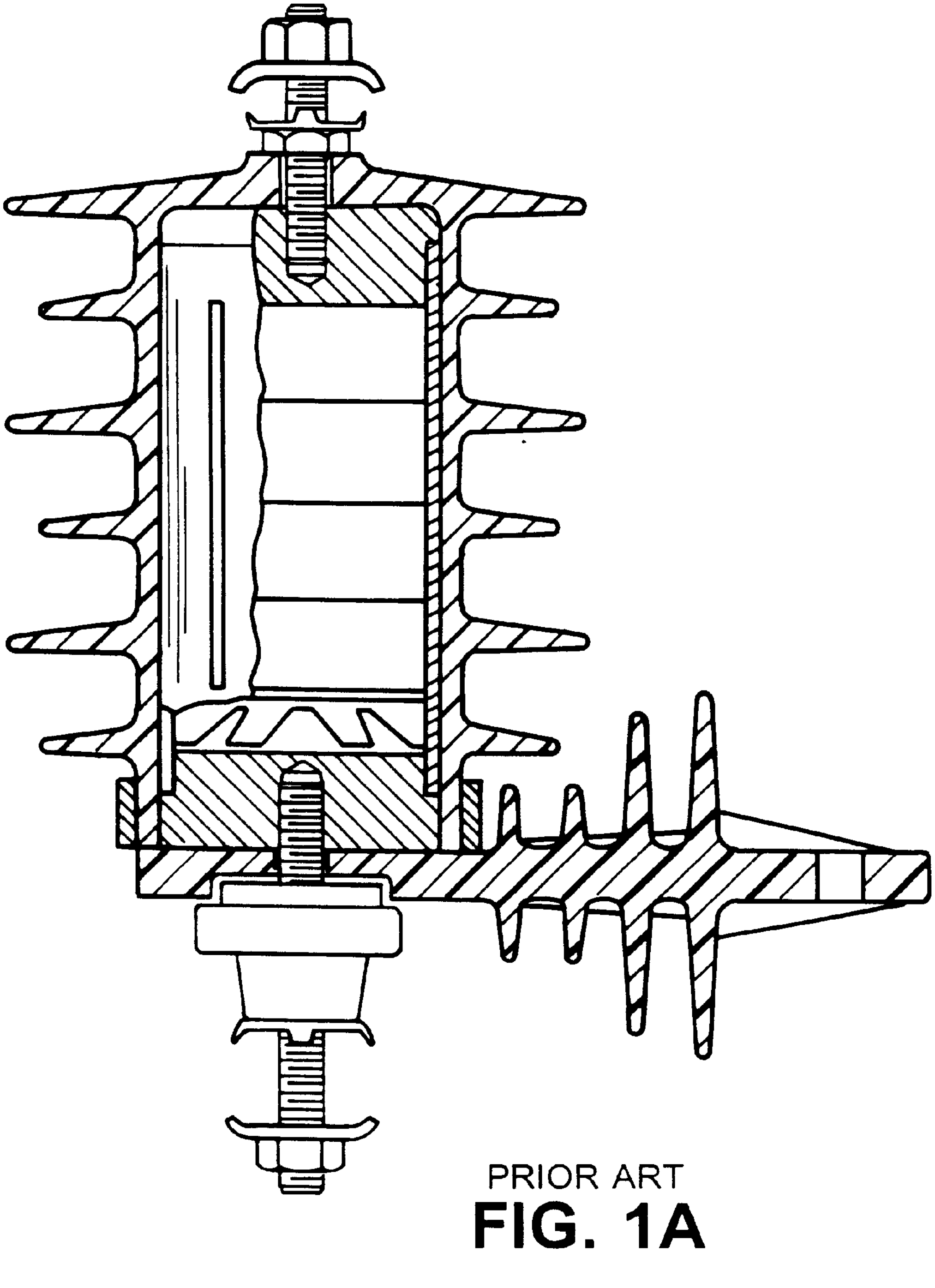
PRIOR ART FIG. 1A
FIG. 1A is a cross-sectional view of a conventional surge arrester.
Figure 1B:
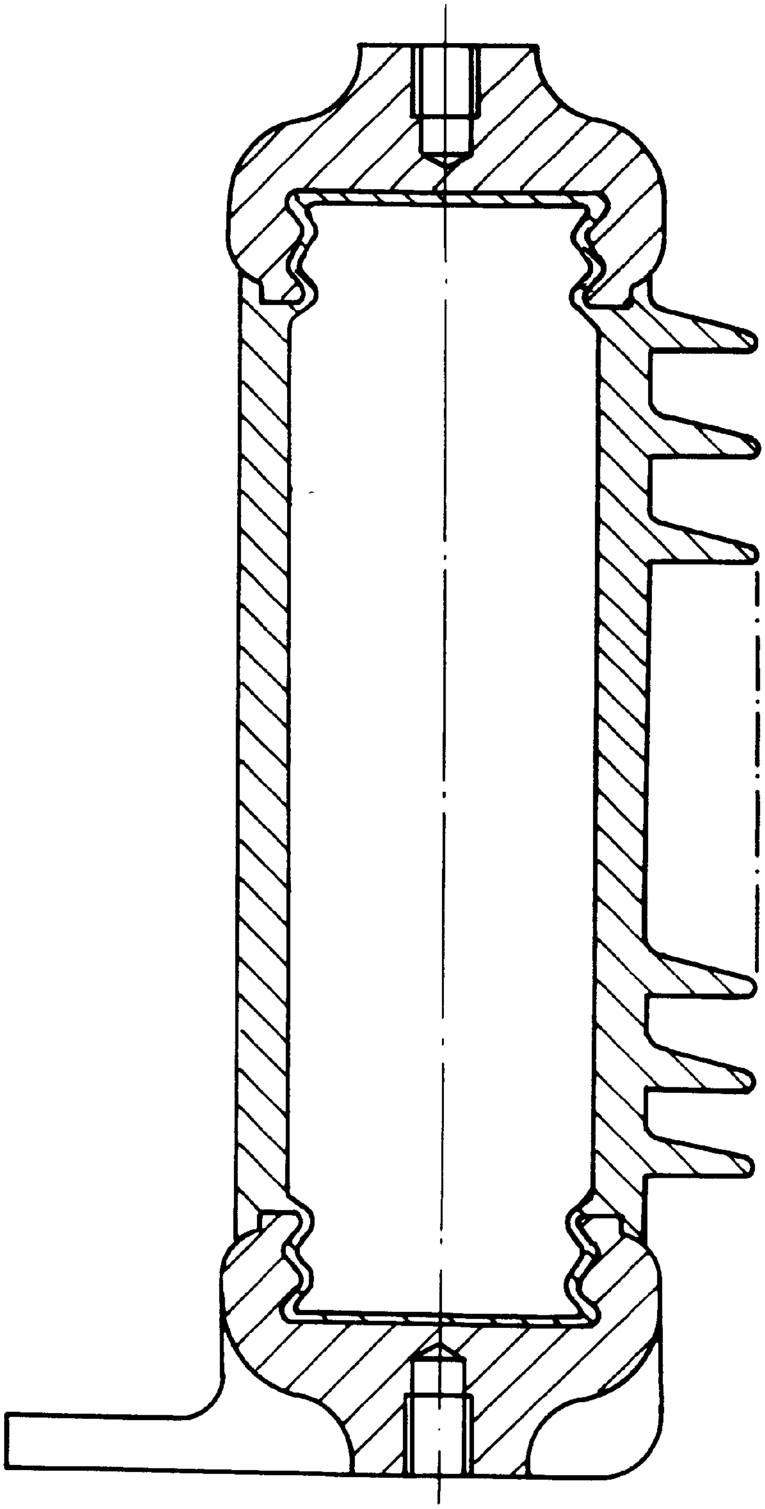
PRIOR ART FIG. 1B
FIG. 1B is a cross-sectional view of another conventional surge arrester.

The various features of the invention will now be described with respect to the figures, in which like parts are identified with the same reference characters.

Figure 2:
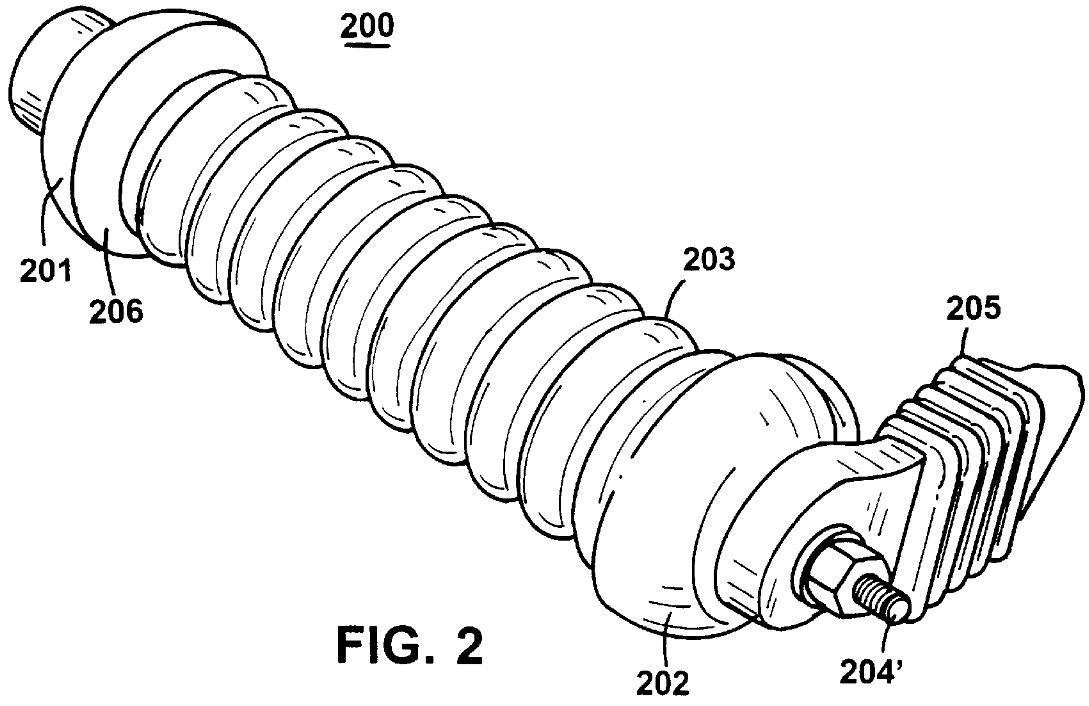
FIG. 2 is a perspective view of an embodiment of the present invention.
Figure 3:
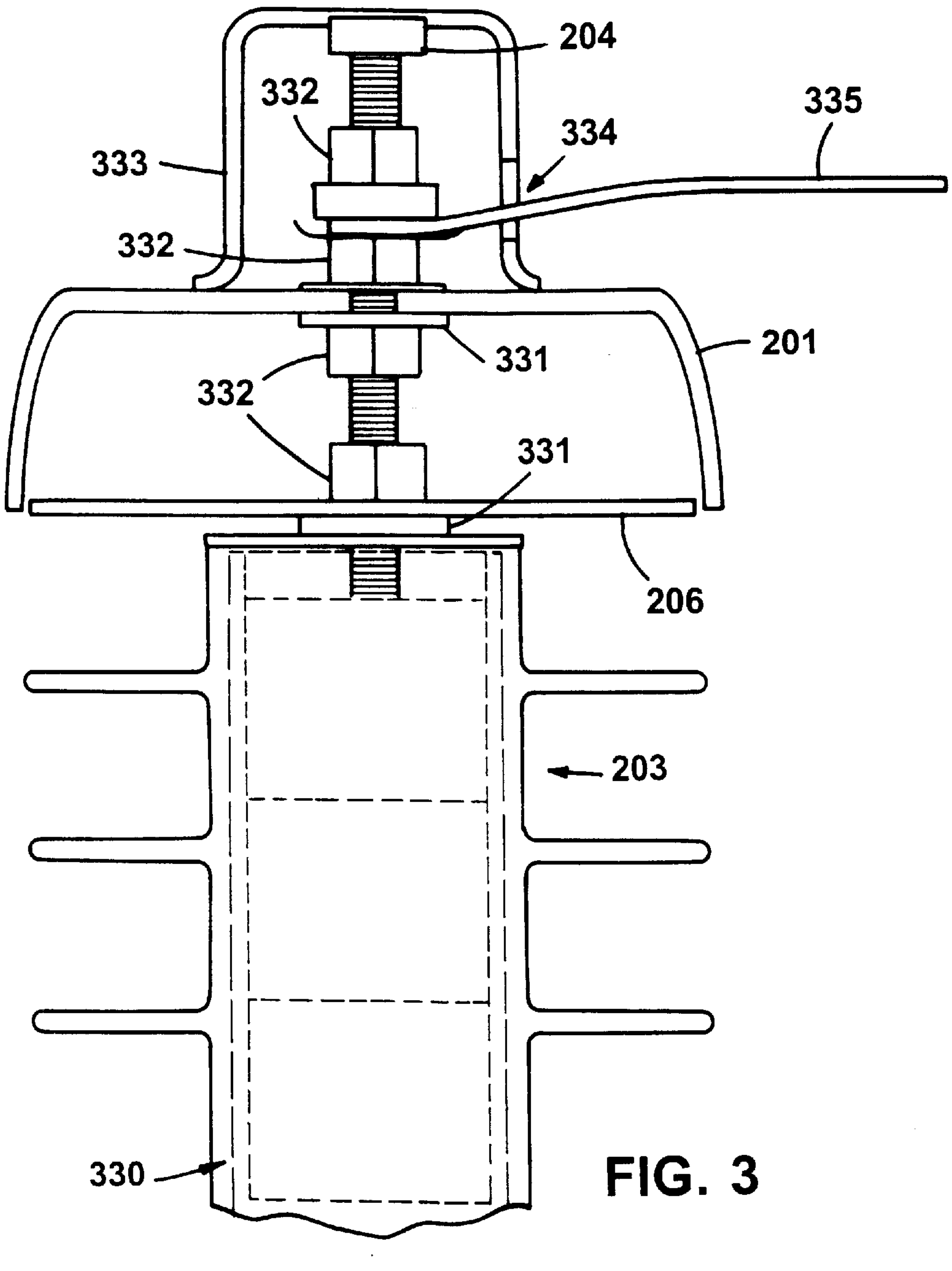
FIG. 3 is an exploded view of the top of an embodiment of the present invention.
Figure 4:
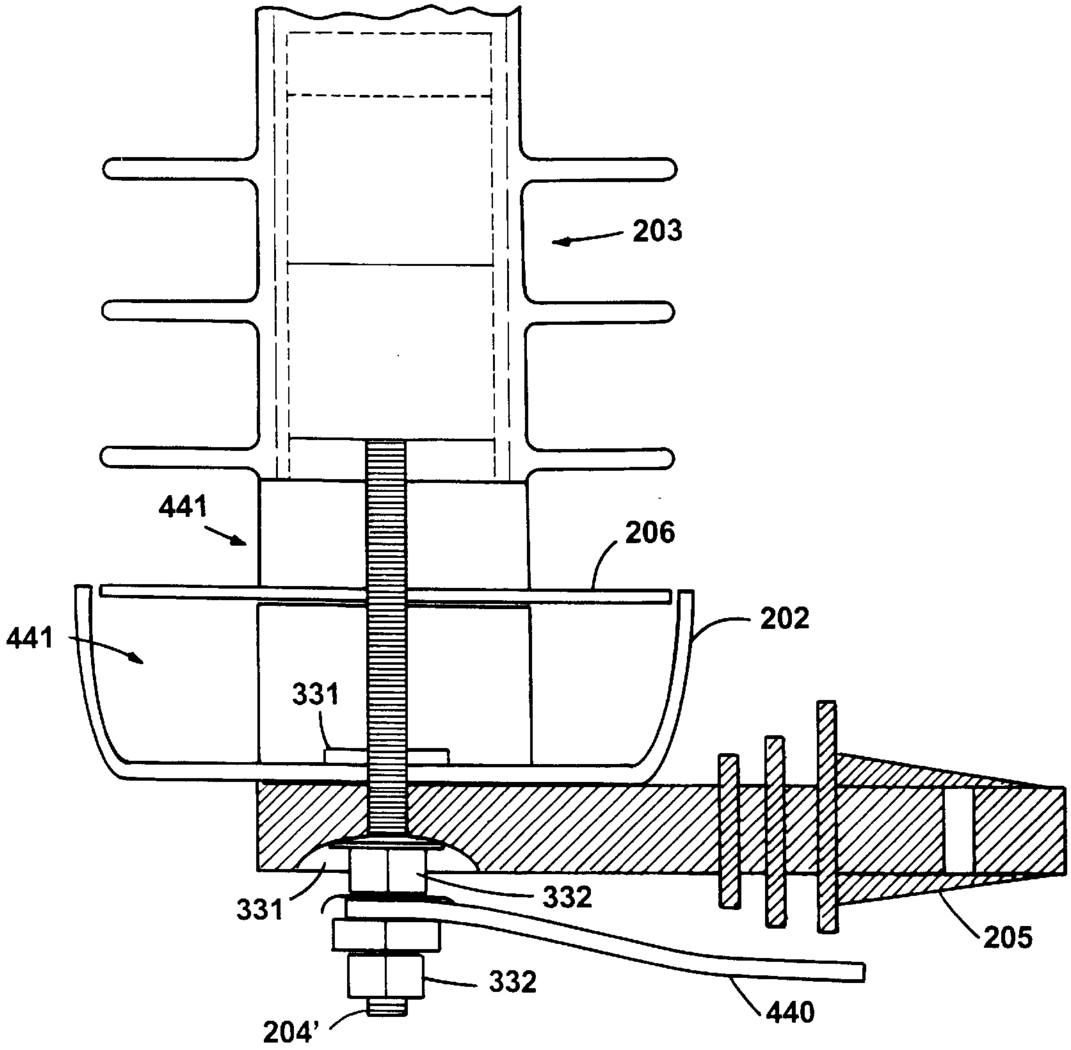
FIG. 4 is an exploded view of the bottom of an embodiment of the present invention.

According to an exemplary embodiment of the present invention, as illustrated in FIGS. 2–4, two components are used in order to achieve a successful vent. Plates 206 minimize the generation of molten material by forcing an arc via a magnetic field created during the venting process to move in a circular path around the arrester 200. Top cap 201 and bottom cap 202 act to contain the arc to the top and bottom plates 206 while also providing a trap to catch any molten material that may be generated during the venting process.

Surge arrester 200 comprises an insulative and protective housing 203, an inner arrester subassembly, and ground and line terminals 204' and 204(not shown, inside top cap), respectively. Plates 206 have machined slots and are connected to the top and bottom of the surge arrester 200 via terminals 204 and 204', respectively. The purpose of these plates 206 is to create a magnetic field during arcing that will force the arc to move around the outside of the arrester in a circular pattern. This movement helps to reduce the amount of molten material formed during the venting process since the heat from the arc will be spread over the entire plate.

Top cap 201 and bottom cap 202 are fastened to the tops and bottoms of the arrester 200, respectively. The bottom cap 202 also acts as a drip catcher to catch any molten material that may be created and fall during the venting process. The arrester 200 is attached to the support structure 205 via terminal 204'.

The weathershed skin 203 physically covers, protects and electrically insulates the subassembly. The skin 203 protects the arrester 200 and is made of rubber, porcelain, elastomeric, or other weather impervious material. Skin 203 substantially seals the subassembly from the ambient environment. The subassembly in turn houses the operative components of the arrester 200.

One skilled in the art will readily appreciate that the present invention can also be retrofit to existing arresters, including but not limited to, silicon carbide, zinc oxide, and varigap arresters. In addition, one skilled in the art will readily appreciate that the present invention can be implemented using any class of arrester, e.g., intermediate and polymer station class, and IEC Class 1–4 arresters.

FIG. 3 illustrates a closeup view of the top of the arrester 200 of FIG. 2. The top cap 201 is placed over the plate 206. The top cap 201 can fit either directly on top of the plate 206 or alternatively, the top cap 201 can receive and extend beyond the plate 206. The plate 206 is attached to the top of the subassembly 330. Skin 203 protects the subassembly 330.

The top cap 201, plate 206 and subassembly 330 are connected together via a terminal 204, which includes a threaded stud assembly, with the use of washers 331 and nuts 332. In one embodiment of the present invention, an optional bird guard 333 can be placed on top of top cap 201 in order to cover the terminal 204. The bird guard 333 will protect birds and other animals from injury in the event the birds or other animals land or come in to contact with the top of the arrester 200. The bird guard 333 includes a slot 334 which allows wire 335 (coming from the electrical equipment) to connect to the terminal 204 within the space provided in the bird guard 333.

In an alternate embodiment of the present invention, a dielectric cover which covers the exposed portion of the plate 206 is provided to shield birds and other animals from injury so as to prevent the birds or animals from landing or coming in to contact with the plate 206.

FIG. 4 illustrates a closeup view of the bottom portion of the arrester 200 of FIG. 2. Plate 206 is attached to arrester 200 via terminal 204, which includes a threaded stud assembly, with the use of washers 331 and nuts 332. The bottom cap 202 fits either directly on top of the plate 206 or alternatively, the bottom cap 202 receives and extends beyond the plate 206. Both the top and bottom caps 201 and 202 provide for weather protection as well as contain the arc within the space between the two caps.

In order to support the arrester 200, an arrester support bracket 205 is connected between the ground wire 440 and the bottom cap 202. Spacers 441 or other structures are used to place the plate.

Figure 5:
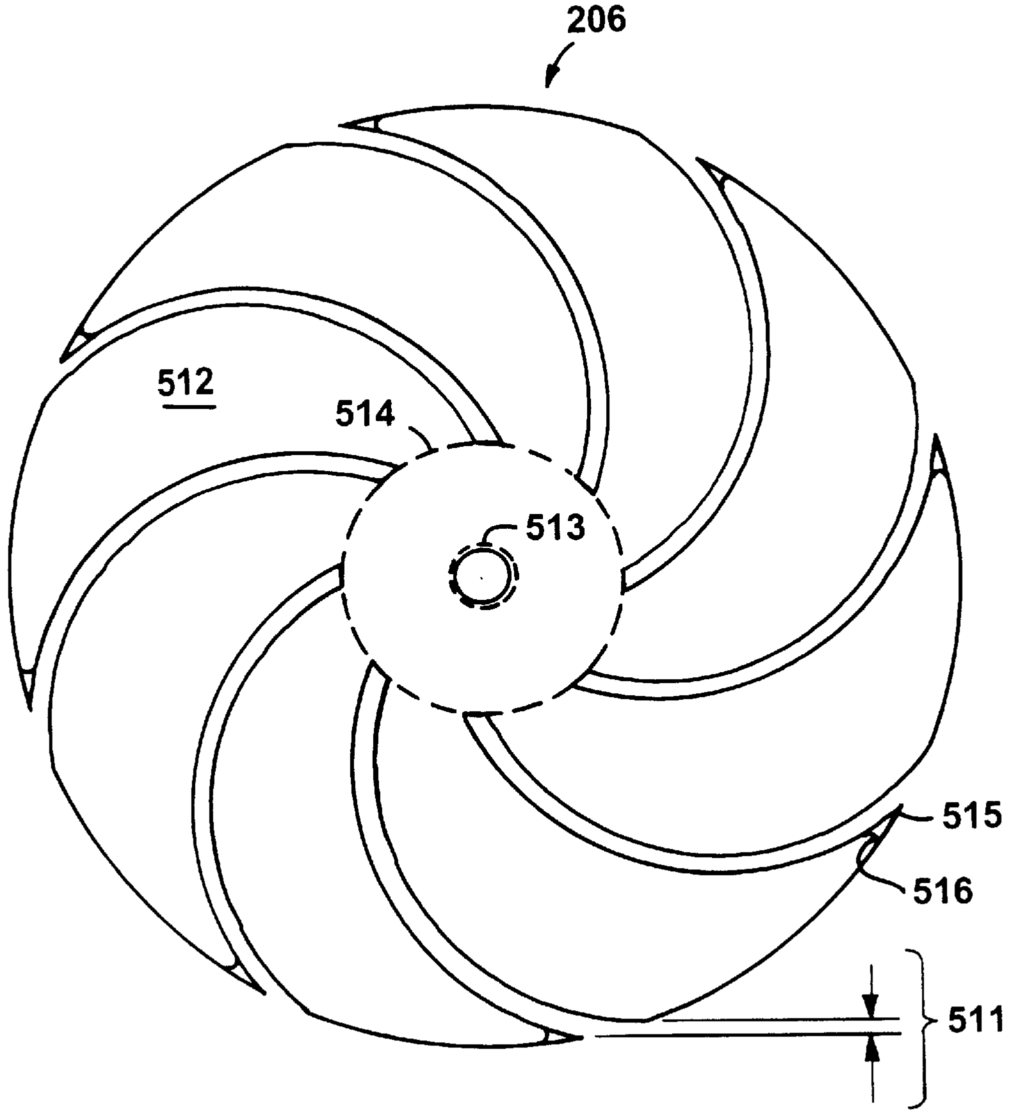
FIG. 5 is a plan view of a plate used in an embodiment of the present invention.

FIG. 5 illustrates the plate 206 of a preferred embodiment of the present invention. Eight slots 511 radiate from inner circle 514 and form individual petals 512. While FIG. 5 illustrates slots which are curved, it will be apparent to one of ordinary skill that slots 511 can be straight or curved so long as the individual petals 512 are produced on the plate 206.

Although the cuts may be straight or curved, the cuts may be either precisely radial or they may extend somewhat in a spiral arrangement.

A hole 513 is provided in the center of the plate 206 in order that the plate 206 may be fastened to the terminals 204, 204'. The plate 206 can be made of any conductive material, e.g., brass, copper, carbon, etc., but should be strong enough to withstand the intense current and heat created during the arching or venting process.

When an arc is formed across the outside of the arrester 200, the arc is attracted to the two plates 206 located at the top and bottom of the arrester 200. Without the plates 206, an arc would form in a straight line directly between the terminals 204, 204' along one side of the arrester 200 and melt the material between the terminals along the line. With the plates 206 installed, during the venting process, an arc will form between the two plates 206. Top and bottom caps 201 and 202 help to contain the arc within the two caps and are preferably made of a nonflammable plastic or other nonconductive, nonflammable material. When the arc is formed between the two plates 206, the petals 512 of the plates 206 create a magnetic field which forces the arc to rotate around the plates 206 and thus the arrester 200. As a result, instead of the arc forming in a single direct line, the heat and energy of the arc is spread out over 360° around the plate 206 and arrester 200. In the event that the arc causes any part of the arrester to melt and drip, bottom cap 202 is provided to catch the molten material and prevent the molten material from falling to the ground or on equipment or people.

In the embodiment shown in FIG. 5, the diameter of the entire plate 206 is approximately 50 mm–150 mm, preferably 100 mm, with a thickness of approximately 2.00 mm–10.00 mm, preferably between 2.5 mm and 3.00 mm. Eight slots 511 are cut into the plate approximately 1.95 mm–2.05 mm wide leaving an inner circle 514 with a diameter approximately 30 mm. However, the slots may be 1.80 mm to 2.20 mm thick.

In another embodiment of the present invention, the tips 515 of each petal 512 may be removed so as to blunt the end thereof. See line 516, which illustrates the end of each petal 512 in this embodiment. The blunt tip is less susceptible to melting than the sharp tip.

Figure 6:
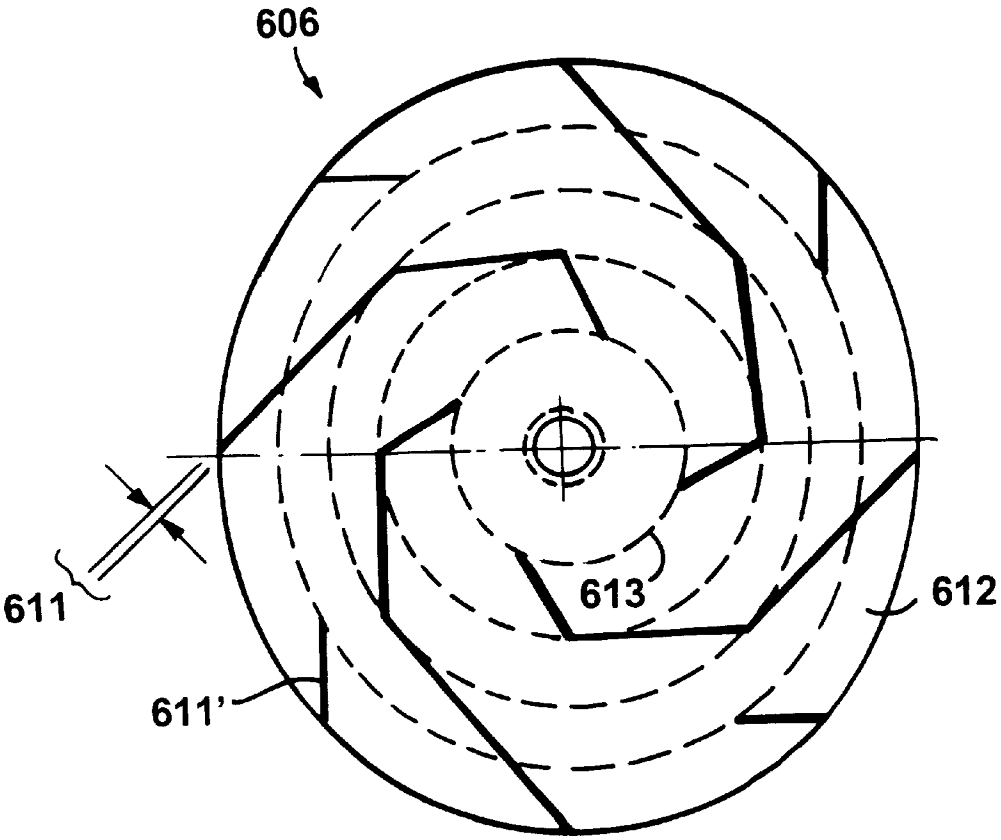
FIG. 6 is a plan view of a plate used in an alternate embodiment of the present invention.

FIG. 6 illustrates an alternate embodiment of the present invention wherein four full length slots 611 are cut radiating from center 613 and four shorter slots 611' are cut extending approximately one-fourth of the distance of the slot 611. While FIG. 6 illustrates that each slot is comprised of multiple straight cuts, each at an angle to the previous cut, it will be apparent to one of ordinary skill that slots 611, 611' can be straight or curved, or a combination of straight and curved, so long as the individual petals 612 are produced on the plate 606.

Figure 7:
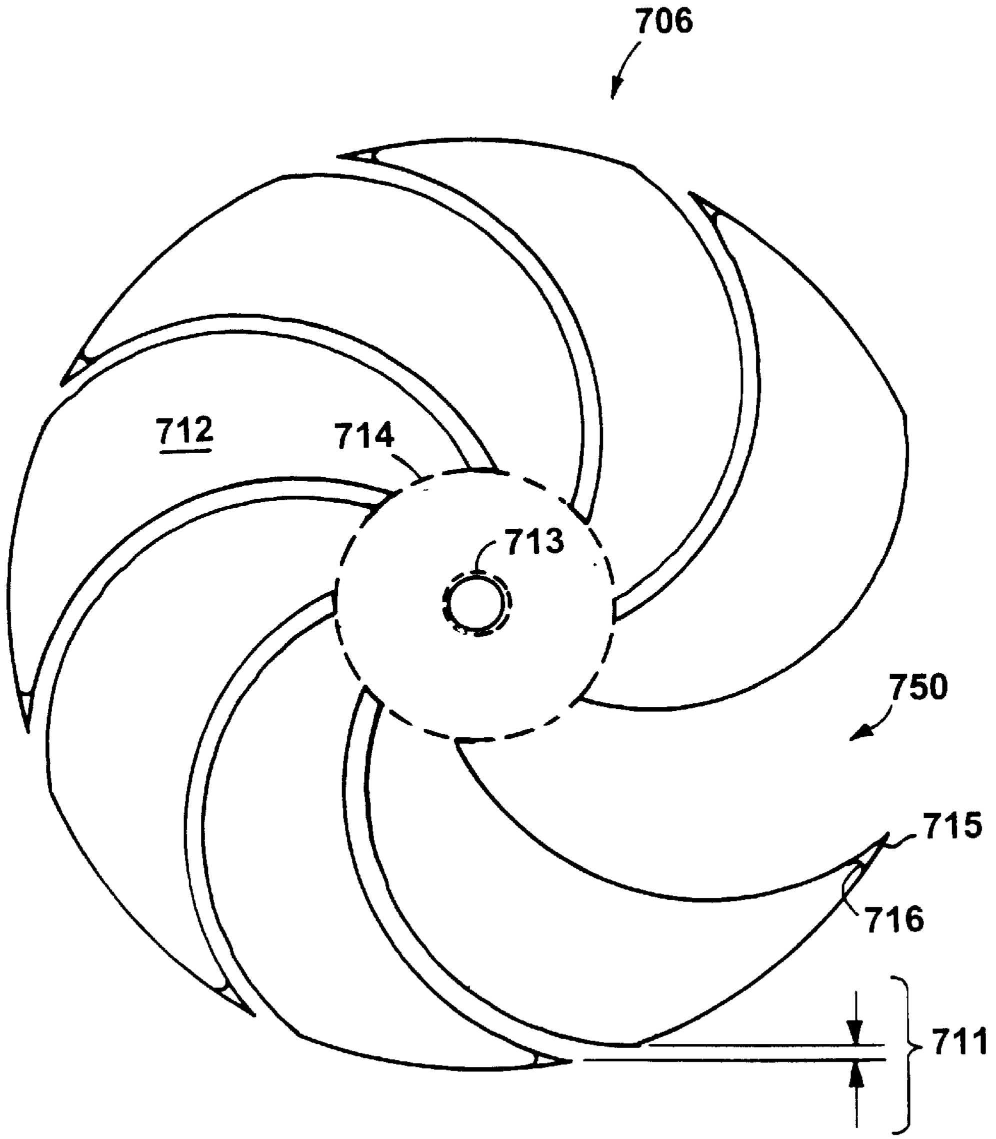
FIG. 7 is a plan view of a plate used in an alternate embodiment of the present invention.

In an alternate embodiment of the present invention, as illustrated in FIG. 7, a petal is removed from the plate of FIG. 5, leaving a gap 750. In this embodiment, six slots 711 radiate from inner circle 714 and form individual petals 712.

While FIG. 7 illustrates slots which are curved, it will be apparent to one of ordinary skill that slots 711 can be straight or curved so long as the individual petals 712 are produced on the plate 706.

Although the cuts may be straight or curved, the cuts may be either precisely radial or they may extend somewhat in a spiral arrangement.

A hole 713 is provided in the center of the plate 706 in order that the plate 706 may be fastened to the terminals 204, 204'. The plate 706 can be made of any conductive material, e.g., brass, copper, carbon, etc., but should be strong enough to withstand the intense current and heat created during the arching or venting process.

When an arc is formed across the outside of the arrester 200, the arc is attracted to the two plates 706 located at the top and bottom of the arrester 200. With the plates 706 installed, during the venting process, an arc will form between the two plates 706. Top and bottom caps 201 and 202 help to contain the arc within the two caps and are preferably made of a nonflammable plastic or other nonconductive, nonflammable material. When the arc is formed between the two plates 706, the petals 712 of the plates 706 create a magnetic field which forces the arc to rotate around the plates 706 and thus the arrester 200. The removal of a petal helps to direct the arc to a fixed position so as to minimize damage to possible nearby equipment. As a result, the arc will be rotated until it reaches the gap 750. When the arc reaches the gap 750, the arc will remain in place and not continue to rotate. In the event that the arc causes any part of the arrester to melt and drip, bottom cap 202 is provided to catch the molten material and prevent the molten material from falling to the ground or on equipment or people. In this embodiment, it may be desirable to increase the thickness of the plates in order to withstand the fault currents and duration of fault currents that are required by station and intermediate class arresters.

In another embodiment of the present invention, the tips 715 of each petal 712 may be removed so as to blunt the end thereof. See line 716, which illustrates the end of each petal 712 in this embodiment. The blunt tip is less susceptible to melting than the sharp tip.

In an alternate embodiment of the present invention only one of the two plates 206 contains slots 511. In this embodiment, the arc produced during the venting process is still forced to move in a circular path around the arrester.

In another alternate embodiment of the present invention, plates are formed by individual petals which are inserted into a center portion of top cap and bottom cap 202.

Alternatively, a circular center region can be separately provided in order to receive multiple petals. The circular region keeps the multiple petals properly aligned so as to ensure the creation of an acceptable magnetic field which will force an arc in a circular path around the arrester.

The invention has been described with reference to exemplary embodiments. However, it will be readily apparent to those skilled in the art that it is possible to embody the invention in specific forms other than those of the exemplary embodiments described above. This may be done without departing from the spirit of the invention. The described embodiments are merely illustrative and should not be considered restrictive in any way. The scope of the invention is given by the appended claims, rather than the preceding description, of the variations and equivalents which fall within the range of the claims are intended to be embraced therein.

What is claimed is:

1. A surge arrester protection system comprising:

a surge arrester;

a first plate fixed on a first end of said surge arrester;

a second plate fixed on a second end of said surge arrester;

wherein at least one of said first and second plates includes a plurality of slots extending substantially radially therein.

2. The system of claim 1, wherein the slots extend completely through the plates.

3. The system of claim 1 further comprising:

a first cap covering said first plate; and a second cap covering said second plate.

4. The system of claim 3, wherein said first and second plates are contained within said first and second covers, respectively.

5. The system of claim 3, wherein a diameter of said first and second plates and a diameter of said first and second covers are greater than or equal to a diameter of said surge arrester.

6. The system of claim 1, further comprising a skin covering said surge arrester, said skin being comprised of a dielectric weather impervious material.

7. The system of claim 1, wherein said slots are arranged in a spiral pattern.

8. The system of claim 1, wherein said slots are straight.

9. The system of claim 1, wherein said slots are curved.

10. The system of claim 1, wherein said first and second plates are comprised of metal.

11. The system of claim 10, wherein both of said first and second plates include a plurality of slots extending substantially radially therein.

12. The system of claim 1, wherein at least one of the slots includes a width substantially larger than a width of other slots.

13. The system of claim 12, wherein the slots define petals between them, and the at least one of the slots includes a width greater than a width of a petal.

14. A method of protecting a surge arrester comprising the steps of:

providing a plate on each end of the surge arrester; and directing arcs around the surge arrester by means of slots extending substantially radially in at least one of said plates.

15. The method of claim 14, wherein said directing step includes creating a magnetic field during arcing to force the arcs to move around the surge arrester.

16. The method of claim 14, wherein said directing step includes directing arcs with curved slots in said plates.

17. The method of claim 14, wherein said directing step includes directing arcs with substantially straight slots in said plates.

18. The method of claim 14, further comprising the step of containing the arcs with first and second caps covering first and second ends of the surge arrester, respectively.

19. The method of claim 14, further comprising the step of catching material dripping from said surge arrester with a cap covering a lower end of said surge arrester.

20. The method of claim 14, wherein the diameter of said first and second plates and the diameter of said first and second caps are greater than or equal to the diameter of said surge arrester.

21. The method of claim 14, wherein said directing step includes directing arcs to a predetermined position on said surge arrester.

22. The method of claim 14, wherein at least one of the slots includes a width substantially larger than a width of other slots.

23. The system of claim 22, wherein the slots define petals between them, and the at least one of the slots includes a width greater than a width of a petal.

24. A surge protection system comprising:

a surge arrester;

means fixed on a first end of said surge arrester for directing arcs circulating around the surge arrester, said means including a plate with a plurality of slots extending substantially radially therein; and means at a second end of the surge arrester for receiving the arcs.

25. The system of claim 24, wherein said means at the second end comprises means for directing arcs around the surge arrester.

26. The system of claim 24, wherein said means at the second end includes a plate with a plurality of slots extending substantially radially therein.

27. The system of claim 24, wherein said means fixed on the first end comprises means for directing arcs to a predetermined position on said surge arrester.

28. The system of claim 24, wherein at least one of the slots includes a width substantially larger than a width of other slots.

29. The system of claim 28, wherein the slots define petals between them, and the at least one of the slots includes a width greater than a width of a petal.

* * * * *